(Model.)
A. J. COLBURN.
POTATO PLANTER.
No. 578,508. Patented Mar. 9, 1897.
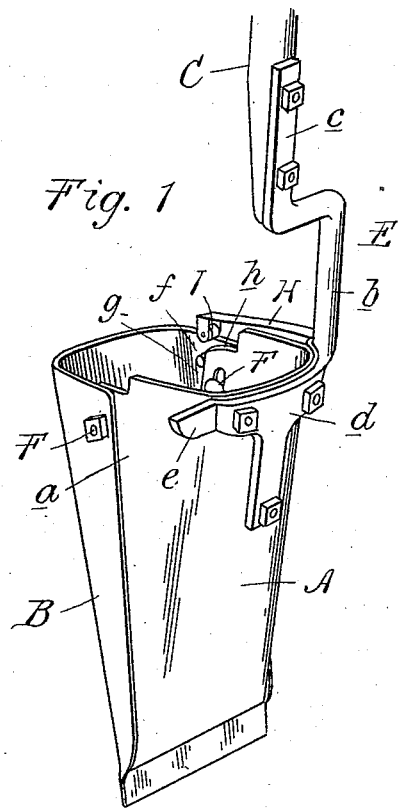
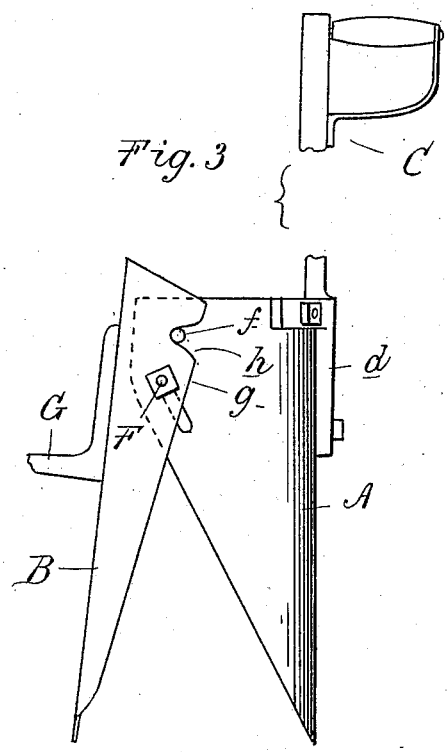
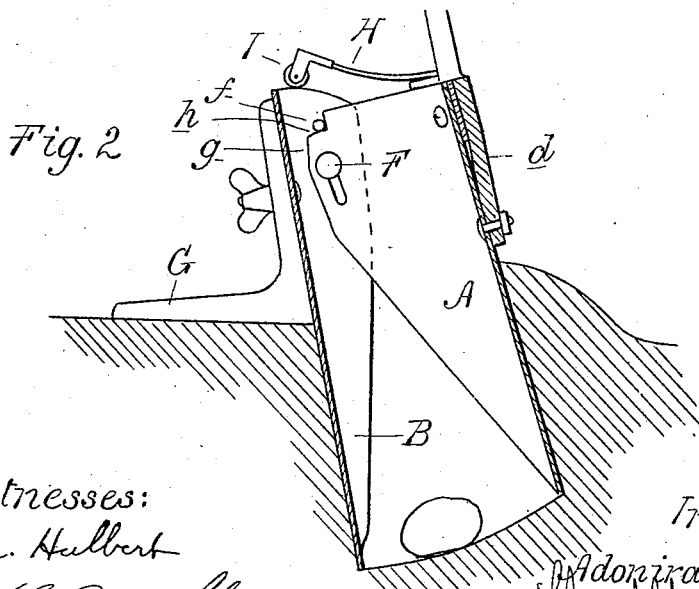
Witnesses:
P. M. Hulbert
Otto H. Barthel
Inventor:
Adoniram J. Colburn
By Todd & Sprague
Attys (Model.)

A. J. COLBURN.
POTATO PLANTER.

No. 578,508. Patented Mar. 9, 1897.

Witnesses:
P. M. Hulbert
Otto F. Barthel

Inventor:
Adoniram J. Colburn
By Thadd Sprague & Son
Attys.

UNITED STATES PATENT OFFICE.

ADONIRAM J. COLBURN, OF GREENVILLE, MICHIGAN, ASSIGNOR TO THE GORDON HOLLOW BLAST GRATE COMPANY, OF SAME PLACE.

POTATO-PLANTER.

SPECIFICATION forming part of Letters Patent No. 578,508, dated March 9, 1897.

Application filed September 14, 1896. Serial No. 605,767. (Model.)

*To all whom it may concern:*

Be it known that I, ADONIRAM J. COLBURN, a citizen of the United States, residing at Greenville, in the county of Montcalm and State of Michigan, have invented certain new and useful Improvements in Potato-Planters, of which the following is a specification, reference being had therein to the accompanying drawings.

My invention relates to planters of that class in which the seed is placed in a beak having its jaws locked closed, which is then inserted in the soil and the jaws unlocked and opened to deposit the seed.

The invention consists in the means employed for holding the jaws from locking except in the closed position, whereby when the jaws are once opened to deposit the seed they will not pick it up again.

The invention further consists in the peculiar construction, arrangement, and combination of the parts, as more fully hereinafter described.

Figure 4:
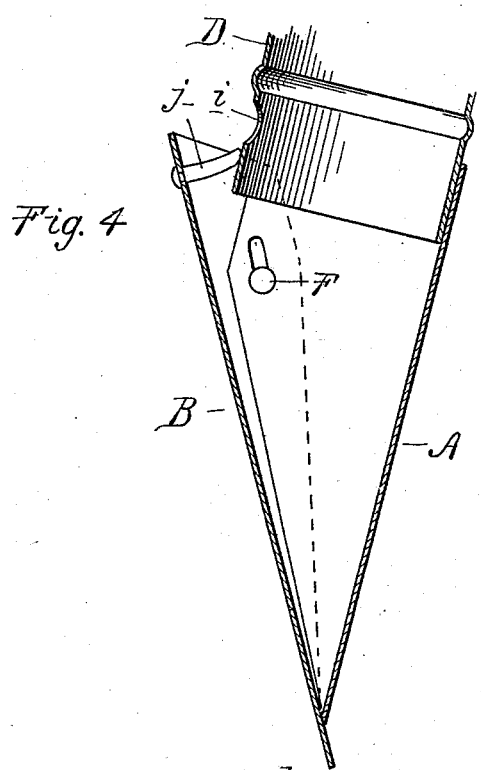
Figure 5:
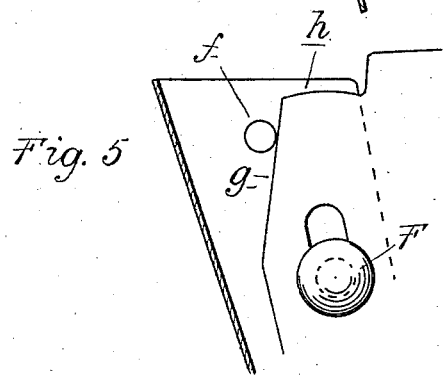

In the drawings, Figure 1 is a perspective view of my planter. Fig. 2 is a vertical central section thereof, showing it as inserted in the ground and the jaws open. Fig. 3 is a side elevation of a modified form of my device. Fig. 4 is a longitudinal section through another modification. Fig. 5 is an enlarged elevation of the locking mechanism.

A is the stationary jaw of the beak, and B is the movable jaw thereof. These are preferably made of sheet metal bent to a substantially U-shaped cross-section at their upper ends, having the sides $a$ tapering to a point at the lower end. The stationary jaw is provided with a handle C, preferably secured thereto by means of the bracket E. This bracket consists of the U-shaped portion $b$, with the upper securing portion $c$, the lower portion $d$, and the spur $e$, the object of the bend being to allow the operator to place his foot on the lower portion thereof to force the beak into the soil.

The jaws A and B are pivoted together near their upper ends by the pins or bolts F, passing through the overlapping flanges $a$, the pivot-bearing of one jaw being slotted to admit of a longitudinal sliding movement of the jaws in relation to each other.

To lock the jaws in their closed position and hold them closed until they are inserted into the earth, where they are free to open, one of the jaws is provided with a pin or lug $f$ and the other with an abutting shoulder having the locking portion $g$ and segmental portion $h$, the latter extending at substantially right angles to the locking portion and serving to hold the jaws from locking while being withdrawn from the ground after the seed has been dropped or while they are in any position excepting when fully closed. This lug $f$ and shoulder portion $h$, which I term a "stop device," forms an efficient means for preventing the locking of the jaws; but it is to be understood that I do not limit myself to any particular stop device, for I am the first to accomplish this result, and other forms, as, for instance, that shown in Fig. 4, could be employed without departing from the scope of my invention.

In Figs. 1, 2, and 5 of the drawings I have shown a construction in which the pin $f$ is secured to the jaw B and the abutting shoulder is formed on the jaw A.

In Fig. 3 I show a construction in which the pin $f$ is on the jaw A and the shoulder is formed on the jaw B.

In Fig. 4 I show another modification, in which a feed-tube D is used, which is extended down to the beak and is provided with an aperture $i$ near its lower end, the jaw B being provided with a lug or pin $j$, extending into proximity to the tube D. In this construction the tube D forms the locking-shoulder and the pin $j$, bearing against the lower side of the aperture $i$, forms the means for holding the jaws from locking when open.

G is an adjustable arm secured to the jaw B and extending laterally therefrom.

In the use of the planter the operator dropping the seed into the beak thrusts it into the ground until the arm G is arrested, which slides the jaw B longitudinally, disengaging the pin $f$ from the locking-shoulder $g$ and unlocking the jaws. By then inclining the handle forward the jaws are opened and the seed deposited, after which the instrument may be withdrawn from the earth.

I am aware that it is old in planters of this kind to have the jaws of the beak locked together when thrust into the soil and released by a longitudinal sliding movement of the movable jaw, but in previously-devised constructions gradually-opening cams have been employed. The serious fault of such construction is the causing of the jaws to begin to close as soon as the planter begins to be withdrawn from the earth, often picking up the seed (such as potatoes) after it has been deposited. With my construction the above fault is obviated by the stop device, comprising the pin $f$, resting on shoulder $h$, holding the jaws open until planter is withdrawn from the earth, when they close and are firmly locked.

In using the planter in light soil the operator frequently throws the device with sufficient force to insert the beak the proper distance into the ground without using his foot. To prevent the possibility of the jaws becoming unlocked when the device is thus thrown, I preferably employ the springs H, secured to the stationary jaw, having the roller I at its free end bearing on the top of the movable jaw. This will hold the jaws locked until they are inserted the proper distance into the ground, when the spring will be compressed and the jaws unlocked in the movement to open the jaws.

What I claim as my invention is—

1. In a planter, a beak, comprising a stationary jaw and a jaw slidably and pivotally secured to the stationary jaw, and a stop device to prevent the sliding movement of said jaw when the planter is being withdrawn from the ground.

2. In a planter, the combination with the beak comprising a stationary jaw and a movable jaw hinged thereto so as to have a swinging and a longitudinally-sliding movement, of means for holding said jaw free to swing except in its closed position, and for locking it in said position, consisting of a lug or pin on one jaw, and a rigid shoulder on the other jaw, adapted to engage the pin and having a segmental holding portion, and a locking portion at substantially right angles thereto.

3. In a planter, the combination with a beak comprising a stationary jaw, and a movable jaw hinged thereto adapted to lock in its closed position by a longitudinally-sliding movement, of means for preventing the accidental opening of said jaws, consisting of the spring H, secured to one jaw and bearing on the upper edge of the other jaw.

4. In a planter, the combination with the beak and the handle therefor, of the bracket E connecting said handle and beak having the U-shaped portion $b$ with the upper securing portion $c$, the lower securing portion $d$ and the spur $e$ for the purpose described.

5. In a potato-planter, a beak comprising a stationary jaw, a movable jaw having a pivotal and sliding connection therewith, and means for locking the jaws in closed position consisting of a projection on one jaw and a locking-shoulder on the other jaw engaging said projection.

In testimony whereof I affix my signature in presence of two witnesses.

ADONIRAM J. COLBURN.

Witnesses:
M. B. O'DOGHERTY,
OTTO F. BARTHEL.